United States Patent [19]
Junker

[11] 3,939,744
[45] Feb. 24, 1976

[54] WIRE EXTRACTOR
[75] Inventor: Bernhard T. Junker, Raleigh, N.C.
[73] Assignee: Monsanto Company, St. Louis, Mo.
[22] Filed: Oct. 30, 1974
[21] Appl. No.: 519,165

[52] U.S. Cl. ..................... 83/118; 83/120; 83/122
[51] Int. Cl.² .................. B23D 19/06; B23D 33/00
[58] Field of Search ............................. 83/118–122

[56] References Cited
UNITED STATES PATENTS

| | | | |
|---|---|---|---|
| 303,893 | 8/1884 | Stewart | 83/122 |
| 595,092 | 12/1897 | Bosley | 83/122 X |
| 789,465 | 5/1905 | Varley et al. | 83/122 |
| 1,096,733 | 5/1914 | May | 83/120 |
| 1,418,844 | 6/1922 | Staude | 83/120 |
| 1,874,173 | 8/1932 | Davis | 83/120 |
| 3,771,398 | 11/1973 | Schaefer et al. | 83/500 X |

*Primary Examiner*—Frank T. Yost
*Attorney, Agent, or Firm*—Donald J. Fitzpatrick

[57] ABSTRACT

An apparatus is disclosed for use in combination with a slitter. The apparatus comprises a body member having teeth and grooves, permitting it to mesh with grooved slitting cutters, means for mounting the body member onto a slitter housing and means for aligning the body member so that a slit product can be readily extracted from the slitting cutters. The apparatus also prevents damage to the slitter in the event the slit product inadvertently breaks during slitting.

7 Claims, 9 Drawing Figures

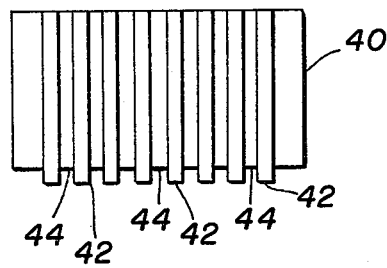
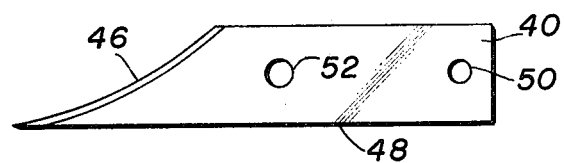
FIG. 6.
FIG. 7.
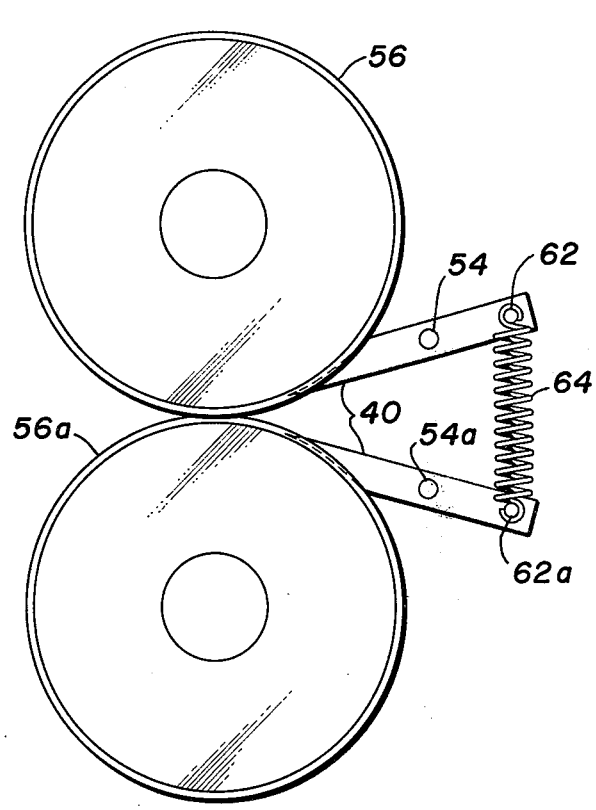
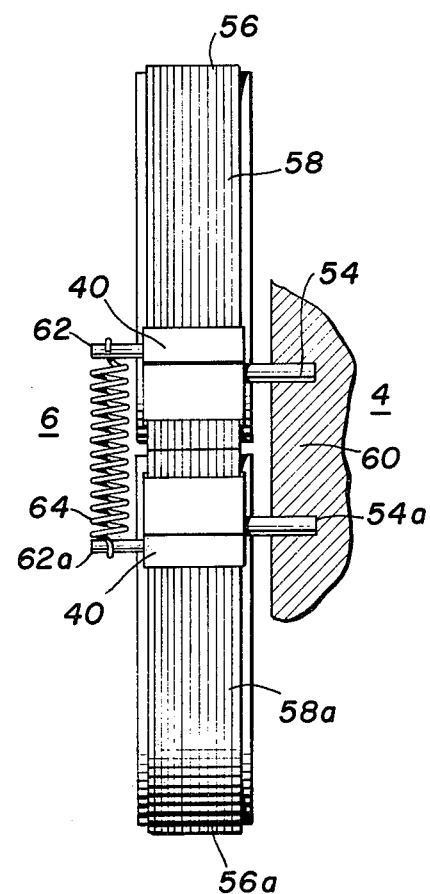
FIG. 8.
FIG. 9.

WIRE EXTRACTOR

BACKGROUND OF THE INVENTION

1. Field of the Invention

This invention relates generally to the slitting of metallic coil stock into fine wire and, more particularly, to an apparatus for ejecting a slit product from grooved slitting cutters.

2. Description of the Prior Art

This invention is adapted to be used in the slitting apparatus disclosed in commonly assigned U.S. patent application, titled "Apparatus for Slitting Coil Stock", Ser. No. 519,173 filed, Oct. 30, 1974. The relevant disclosure of this copending application is herein incorporated by reference. In the apparatus disclosed in this copending application a pair of matched, solid monolithic cutters containing an arrangement of lands and grooves slit metallic coil stock into fine wire. During the slitting operation the lands of one cutter force the slit product into the corresponding grooves of the other cutter. The wire can be removed by adjusting tension on the slitting line recoilers. However, if tension is not properly adjusted the wires can be easily broken if too much tension is applied. Furthermore, if a wire breaks in the slitter during slitting and, this is not uncommon owing to the extremely fine cross-sectional areas involved, e.g., less than $7.0 \times 10^{-4}$ sq. in., the broken wire must be immediately removed otherwise it will wrap around the cutters and damage the tooling.

SUMMARY OF THE INVENTION

In accordance with my invention, as hereinafter more fully described, I provide an apparatus for ejecting a slit product from a pair of solid monolithic grooved cutters. By employing this apparatus on a slitting line where strip is converted into fine wire breakage during rewinding is avoided, and damage to the cutters in the event of a defect is likewise prevented.

The apparatus of this invention basically comprises three components:

- a body member having teeth and grooves wherein the teeth are adapted to mesh with grooved slitting cutters;
- means for mounting the body member onto a slitter housing so that the teeth of the body member mesh with the grooved cutters whereby axial movement of the body member is prevented; and,
- means for aligning the body member so that the angular position of the body member with respect to the grooved cutter is such that slit wire is readily extracted.

Accordingly, it is an object of this invention to provide an apparatus for ejecting slit wire from grooved slitting cutters.

It is a further object of this invention to provide an apparatus which will eject wire from a grooved slitter with minimum pull required.

Another object of this invention is to provide an apparatus that will prevent damage to the slitting cutters in the event of breakage of wire during slitting.

BRIEF DESCRIPTION OF THE DRAWINGS

FIG. 6 is an enlarged plan view showing another embodiment of a wire ejector body member.

FIG. 7 is an enlarged side elevational view of this body member.

FIG. 8 is a front elevational view showing a pair of wire ejectors mounted on a slitter.

FIG. 9 is a side elevational view showing a pair of wire ejectors mounted on a slitter.

DESCRIPTION OF THE PREFERRED EMBODIMENT

The foregoing objects and further objects of this invention will be understood by those skilled in the art from the following detailed description of the invention, taken in connection with the accompanying drawings.

FIGS. 1–5 show one embodiment of the invention and FIGS. 6–9 show another embodiment. Both embodiments show that the invention comprises the following principal elements: a toothed body member 2, means for mounting the body member on a slitting housing 4 and means for aligning the body member 6.

Figure 1:
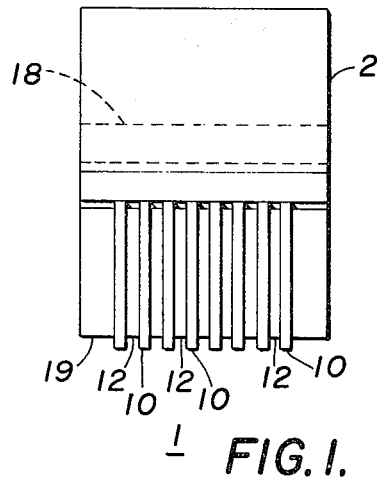
FIG. 1 is an enlarged plan view showing one embodiment of a wire ejector body member.
Figure 2:
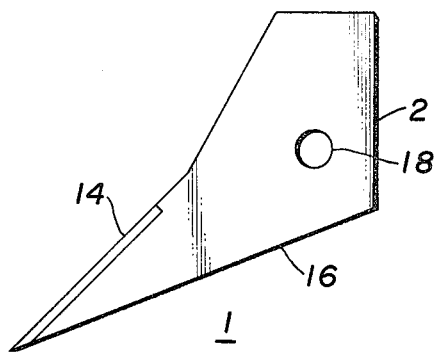
FIG. 2 is an enlarged side elevational view of this body member.
Figure 3:
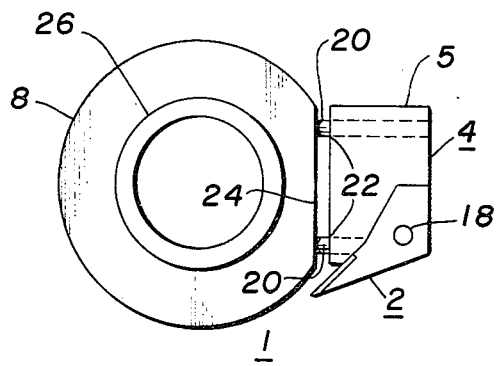
FIG. 3 is a front elevational view of a wire ejector.

Referring now to FIGS. 1, 2 and 3 there is shown in detail the construction of an apparatus of this invention. These views show that wire ejector 1 comprises a body member 2, mounting means 4 is a holder 5 for receiving and positioning the body member in a manner as will hereinafter be more fully described. The holder with the body member mounted thereon is then fastened to an annular support ring 8.

Body member 2 comprises a series of teeth 10 and grooves 12 arranged in a specific pattern. The dimensions of these teeth and grooves are carefully machined so that the body member can mesh with the corresponding elements on grooved cutter 34. The teeth and grooves of the body member are contained in a tapered top 14 and is adapted to mesh with the corresponding elements 36 on cutter 34. Flat back portion 16 is designed to provide a smooth path for slit wire W after the wire is ejected from the cutter. A bore 18 is adapted to receive a fastener for attaching the body member to holder 5. The width of the body member shown by the numeral 19 is at least equal to the width of cutter 34. This insures that slit wire will be ejected from each cutter groove.

Annular support ring 8 contains a flat surface 24. Guide pins 20 project outwardly from this flat surface and match up with guide pin holes 22 which are placed at diagonal corners of holder 5. When the guide pins are inserted into the matching holes on the holder the assembly is ready to be placed on a slitter. The support ring is provided with an annular bearing 26.

Figure 4:
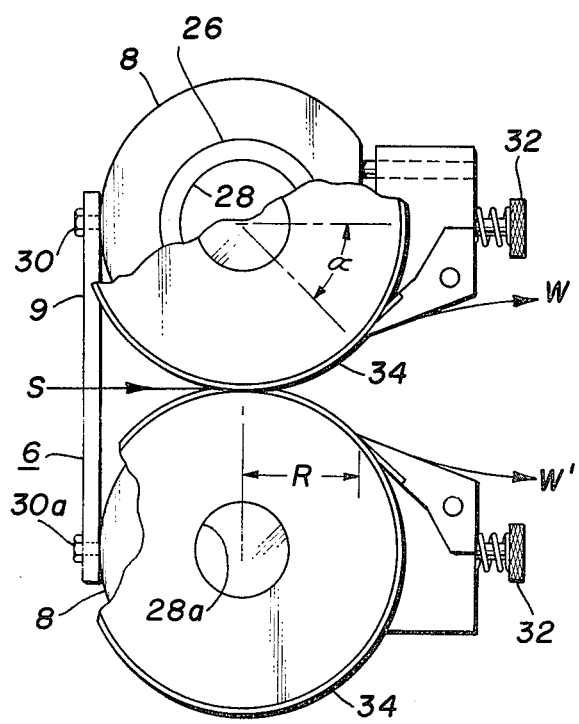
FIG. 4 is a front elevational view partially cut away showing a pair of wire ejectors mounted on a slitter.
Figure 5:
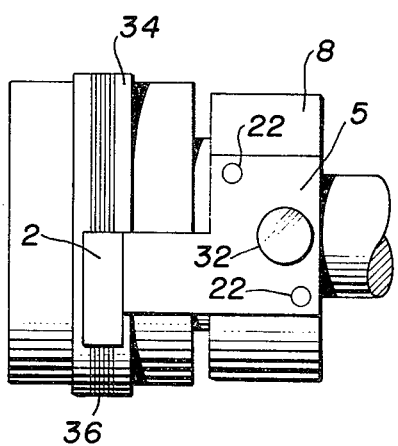
FIG. 5 is a side elevational view showing a wire ejector mounted on a slitter.

FIGS. 4 and 5 show the installation of wire ejector 1 on a simplified representation of a slitter. The slitter is provided with a pair of arbors 28 and 28a that revolve between annular bearings 26 and support rings 8. A pair of matched grooved cutters 34 are mounted on the arbors. As shown in FIG. 5 grooves 36 of the cutter mesh with the teeth of the body member. By moving the holder guide pins laterally the amount of meshing engagement between the wire ejector and cutter can be varied. The position of the ends of the body member teeth is shown by the letter R. Axial movement of the body member is prevented by positioning the teeth of the body member within the grooves of cutter 34.

In this embodiment aligning means 6 is a strap 9 fastened at 30 and 30a to annular support ring 8. This element prevents the support rings from rotating and by varying the strap length the angular position of the body member with respect to the nip formed by the two cutters can be adjusted.

Adjusting means 32 shown as a spring is provided in the holder for maintaining the teeth of body member within the grooves of the cutter. As shown in FIG. 4 S denotes an incoming metallic sheet W, and W' denotes a pair of slit multiples.

FIGS. 6–9 show another embodiment depicting the apparatus of this invention. This embodiment is a modification of the apparatus hereinbefore described. FIGS. 6 and 7 show the ejector comprises a body member 40, provided with teeth 42 and grooves 44 in a tapered front portion 46. This tapered portion is adapted to mesh with a grooved cutter roll. Flat portion 48 provides a smooth path for slit wire to travel after ejection from the cutter. A hole 52 is provided near the tapered front portion of the body member to facilitate mounting the ejector onto a slitter housing 60.

In this embodiment a holder is not required. Mounting means 4 is a fastener which fastens the ejector directly to the slitter housing. A pin 54 passes through hole 52, cooperates with a corresponding hole in the slitter housing and as shown in FIGS. 8 and 9 positions the body member onto the slitter housing. In these figures cutters 56 and 56a are shown in engaging relationship wherein the grooves 58 of cutter 56 engage the opposed grooves 58a of cutter 56a. A pair of wire ejectors are positioned on the slitter and aligning means 6 is a helical spring 64 suspended between a pair of pins 62 and 62a that are placed into holes 50 and 50a, spring 64 is then placed onto the pins and tension is applied so that the tapered front ends of the ejectors are forced into meshing engagement with the cutters 56 and 56a.

The herein described apparatus of this invention can be adapted to eject slit ferrous and non-ferrous materials. In rewinding slit non-ferrous materials pull-out tension must be quite low in order not to exceed the breaking strength of the slit product. In one installation of the apparatus of this invention 0.010 inch thick aluminum sheet was slit into fine wire and was easily extracted with a minimum pull-out tension. Prior attempts to slit aluminum with out employing this invention were unsuccessful.

It may, therefore, be seen that the invention described herein provides an apparatus for ejecting a slit product while at the same time protecting tooling in the event of a malfunction.

Various modifications of the invention in addition to those shown and described herein will become apparent to those skilled in the art from the foregoing description and accompanying drawings. Such modifications are intended to fall within the scope of the appended claims.

I claim:

1. A wire extractor for use in combination with a slitter having a stationary housing, a pair of arbors mounted in said housing and grooved cutters positioned on said arbors, comprising:
    a body member having teeth and grooves wherein said teeth are adapted to mesh with said grooved cutters;
    a holder for receiving and positioning said body member on said housing;
    an annular support ring for supporting said holder on said arbor so that the teeth of said body member mesh with the grooves of said cutter whereby axial movement of said body member is prevented; and
    means for aligning said body member so that the angular position of the teeth of said body member with respect to the grooved cutters is such that slit wire is readily extracted.

2. A wire extractor as recited in claim 1 wherein said holder further comprises:
    a bore; and
    adjusting means positioned in said bore for maintaining the teeth of said body member in meshing engagement with said cutters.

3. A wire extractor as recited in claim 1 wherein said support ring further comprises means for varying the meshing engagement between said body member and said cutters by laterally moving said holder.

4. A wire extractor as recited in claim 1 further comprising:
    a pair of body members;
    a pair of holders for receiving and positioning said body members on said housing; and
    a pair of annular support rings for supporting said holders on said arbors.

5. A wire extractor as recited in claim 4 wherein said aligning means further comprises a strap fastened to the periphery of said support rings thereby preventing rotation of said support rings.

6. A wire extractor for use in combination with a slitter having a stationary housing, a pair of arbors mounted in said housing and grooved cutters positioned on said arbors, comprising:
    a pair of body members each having teeth and grooves at a contacting portion wherein said teeth are adapted to mesh with said grooved cutters and a pin adjacent the non-meshing end portion;
    means for mounting said body members onto said housing; and
    spring means disposed between said pins for urging said body members into meshing engagement with said cutters.

7. A wire extractor as recited in claim 6 wherein said mounting means further comprises:
    a bore adjacent the tapered front portion of said body member; and
    a pin fastened to said housing and adapted to be inserted into said bore.

* * * * *